May 5, 1953

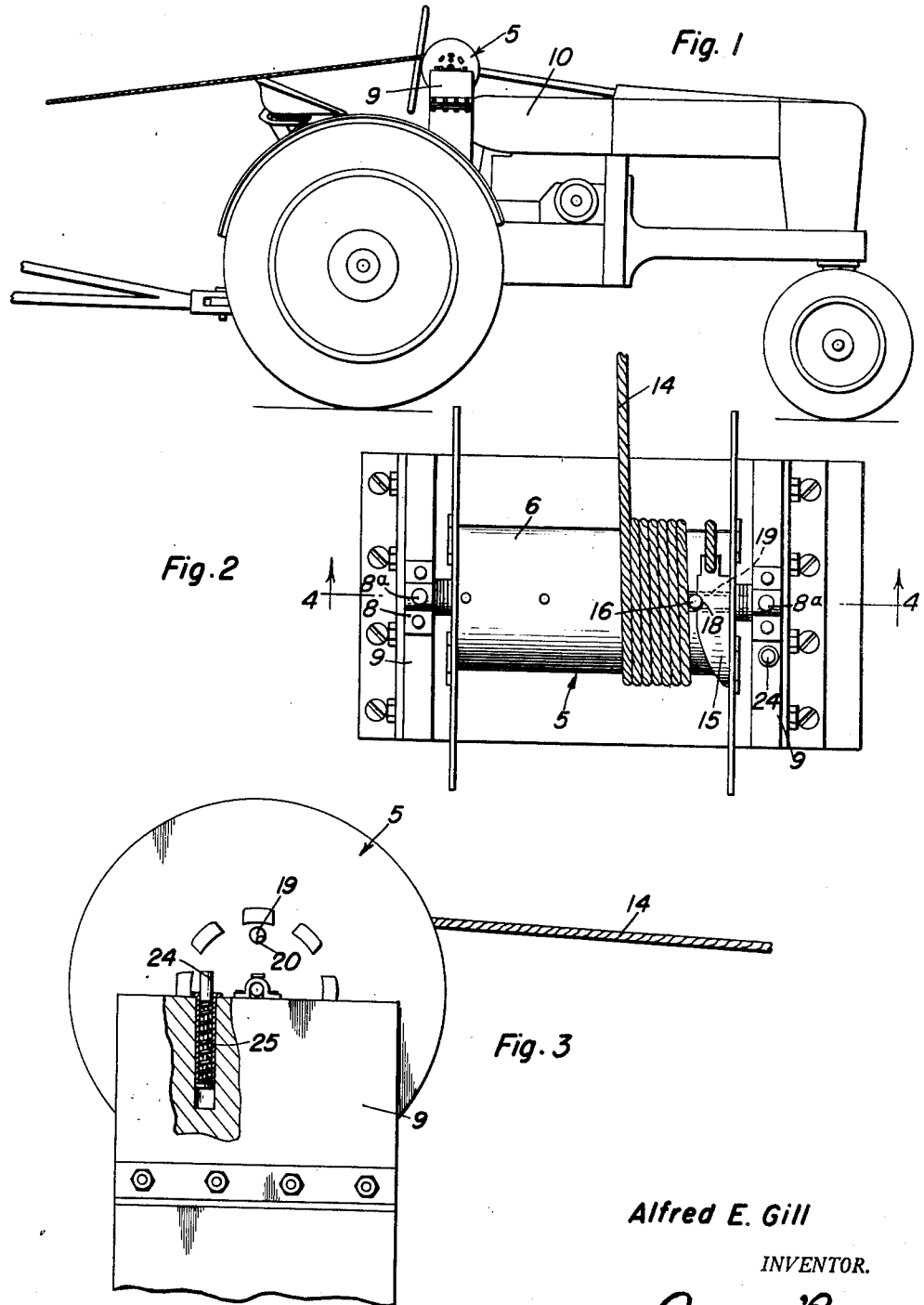

A. E. GILL 2,637,510

TRIP ROPE TENSIONING AND RELEASING DEVICE

Filed Aug. 8, 1950

Alfred E. Gill
INVENTOR.

BY *Clarence A. O'Brien*
*and Harvey B. Jacobson*
Attorneys

Patented May 5, 1953

2,637,510

UNITED STATES PATENT OFFICE 2,637,510

TRIP ROPE TENSIONING AND RELEASING DEVICE

Alfred E. Gill, Plentywood, Mont.

Application August 8, 1950, Serial No. 178,313

7 Claims. (Cl. 242—107)

The present invention relates to new and useful improvements in tensioning and releasing devices for tractor trip ropes embodying means whereby the trip rope will be held taut at all times and automatically released in the event the implement becomes detached from the tractor.

An important object of the invention is to provide a spring drum for the trip rope whereby tension thereof is constantly maintained and providing an automatically releasable connection for the rope with the drum to detach the rope when the tractor and the implement drawn thereby become uncoupled.

Another object is to provide an automatic brake for the drum to prevent rotating thereof by the spring when the rope is released and wherein the brake is controlled by the releasable connecting means for the rope.

A further object is to provide a device of this character of simple and practical construction, which is efficient and reliable in operation, relatively inexpensive to manufacture and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of a tractor showing the device mounted thereon;

Figure 2 is an enlarged top plan view;

Figure 3 is an end elevational view with parts shown in section;

Figure 4:
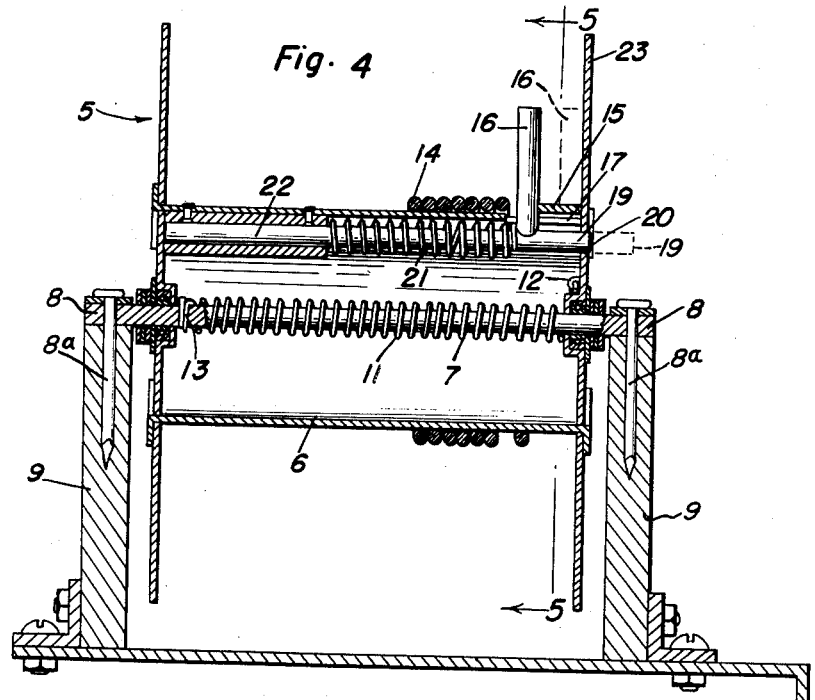
Figure 4 is an enlarged longitudinal sectional view taken on a line 4—4 of Figure 2.
Figure 5:
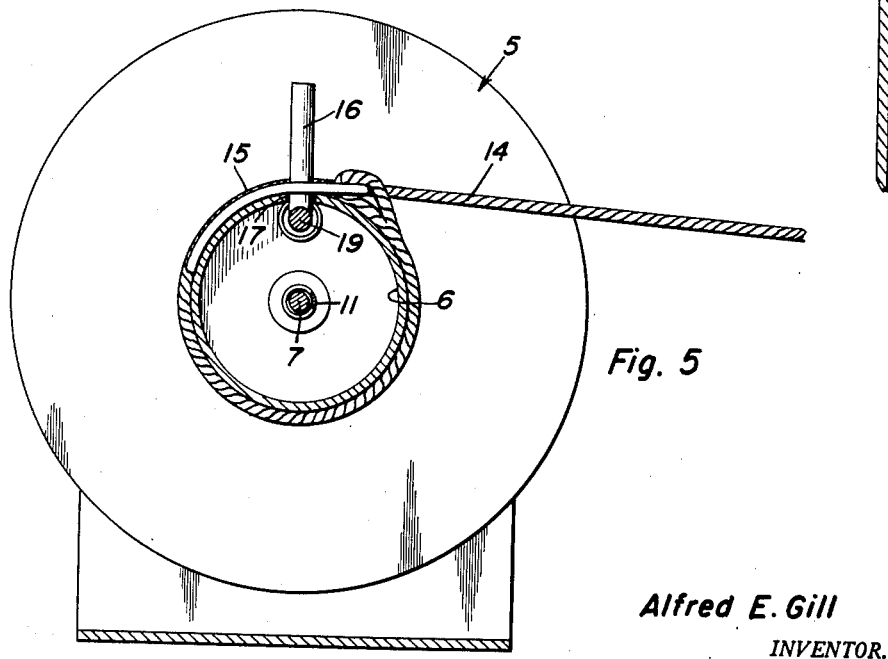
Figure 5 is a sectional view taken on a line 5—5 of Figure 4.

Referring now to the drawings in detail, wherein for the purpose of illustration I have disclosed a preferred embodiment of my invention, the numeral 5 designates a drum having a hollow hub 6 journalled on a stationary shaft 7 fixed in brackets 8 by pins 8a passing through the ends of the shaft. Brackets 8 are attached to a mounting 9 adapted for attaching to a tractor 10 in a convenient position for the driver. A coil spring 11 is positioned in the hollow hub 6 and surrounds shaft 7, with one end of the spring 12 anchored to the drum and the other end 13 of the spring anchored to the shaft.

A trip rope 14 is wound on the hub 6 of the drum and is releasably connected thereto by an arcuate wedge shaped connector 15 attached at one end to the rope and held on the hub by a locking pin 16 projecting radially through a slot 17 in the hub and seated in a notch 18 in one edge of the connector 15. Pin 16 is formed at its inner end with a brake pin 19 internally of the hub and slidable inwardly and outwardly in an opening 20 in one end of the drum. A coil spring 21 is placed on the inner end of brake pin 19 to project the latter outwardly, spring 21 being supported on a guide pin 22 attached internally of hub 6. Spring 21 holds locking pin 16 in notch 18 and forces connector 15 against an adjacent flange 23 of the drum.

A shock absorbing pin 24 is slidable vertically in mounting 9 and is projected upwardly by a coil spring 25 to hold pin 24 in the path of brake pin 19 when the latter moves in a downward path by the rotation of the drum after connector 15 is pulled from the drum by the uncoupling of the implement from the tractor, the pin 24 absorbing the shock of the downward striking force of pin 19.

In the operation of the device, connector 15 with trip rope 14 attached thereto is forced between locking pin 16 and the adjacent flange 23 of the drum to engage pin 16 in notch 18 of the connector and which thus serves as a friction gripping connecting means for the rope with the drum. Coil spring 11 rotates drum 5 in a direction to wind rope 14 thereon to thus take up slack in the rope.

Connector 15 holds brake pin 19 inwardly to permit free rotation of the drum.

Should the implement drawn by the tractor and to which rope 14 is attached become uncoupled or separated from the tractor, the rope will be unwound from drum 5 and connector 15 pulled free of the drum, whereupon brake pin 19 will be projected outwardly at the end of the drum by spring 21 to engage the top of mounting 9 to check rotation of the drum by spring 11. The force of brake pin 19 striking the mounting 9 is checked by shock absorbing pin 24.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A trip rope tensioning device comprising a spring drum, a connector for one end of a rope to be wound on the drum, and a locking pin carried by the drum and releasably holding the connector thereon.

2. A trip rope tensioning device comprising a spring drum, a connector for one end of a rope to be wound on the drum, a locking pin carried by the drum, and spring means holding the pin in frictional locking engagement with the connector.

3. A trip rope tensioning device comprising a spring drum, a connector for one end of a rope to be wound on the drum, a locking pin carried by the drum, spring means holding the pin in frictional locking engagement with the connector, and braking means for the drum moved into braking position by a releasing movement of the connector from the locking pin.

4. A trip rope tensioning device comprising a spring drum, a connector for the rope, a radially projecting and longitudinally slidable locking pin carried by the drum, and spring means to hold the pin in releasable locking engagement with the connector.

5. A trip rope tensioning device comprising a spring drum, a radially projecting longitudinally slidable locking pin carried by the drum, spring means holding the locking pin opposed to a flange on the drum, and a rope connector frictionally held between the pin and flange.

6. A trip rope tensioning device comprising a spring drum, a radially projecting longitudinally slidable locking pin carried by the drum, spring means holding the locking pin opposed to a flange on the drum, a rope connector frictionally held between the pin and flange, and brake means for the drum moved into braking position by the locking pin upon disengagement of the connector therefrom.

7. A trip rope tensioning device comprising a spring drum, a radially projecting longitudinally slidable locking pin carried by the drum, spring means holding the locking pin opposed to a flange on the drum, a rope connector frictionally held between the pin and flange, and a brake pin carried by the locking pin and slidable outwardly at one end of the drum for engagement with a stationary structure to hold the drum stationary upon disengagement of the connector from the locking pin.

ALFRED E. GILL.

References Cited in the file of this patent

UNITED STATES PATENTS

| Number | Name | Date |
|---|---|---|
| 1,461,052 | Simpson | July 10, 1923 |
| 1,708,755 | Dierksmier | Apr. 9, 1929 |
| 1,786,314 | Passmel | Dec. 23, 1930 |
| 1,839,099 | Helmke | Dec. 29, 1931 |
| 2,025,890 | Payne | Dec. 31, 1935 |
| 2,053,976 | Stahl | Sept. 8, 1936 |
| 2,262,665 | Cavanaugh | Nov. 11, 1941 |
| 2,391,141 | Dour et al. | Dec. 18, 1945 |
| 2,481,638 | Borup | Sept. 13, 1949 |